United States Patent
Webb

(10) Patent No.: US 8,970,739 B2
(45) Date of Patent: Mar. 3, 2015

(54) DEVICES AND METHODS FOR CREATING STRUCTURE HISTOGRAMS FOR USE IN IMAGE ENHANCEMENT

(75) Inventor: Russell Y. Webb, Cupertino, CA (US)

(73) Assignee: Apple Inc., Cupertino, CA (US)

( * ) Notice: Subject to any disclaimer, the term of this patent is extended or adjusted under 35 U.S.C. 154(b) by 326 days.

(21) Appl. No.: 13/412,368

(22) Filed: Mar. 5, 2012

(65) Prior Publication Data

US 2013/0229541 A1    Sep. 5, 2013

(51) Int. Cl.
*H04N 5/217*     (2011.01)
*G06K 9/00*      (2006.01)

(52) U.S. Cl.
USPC .......................................... 348/241; 382/168

(58) Field of Classification Search
CPC .......................... H04N 5/23229; H04N 1/4074
USPC .................................. 348/241; 382/168–172
See application file for complete search history.

(56) References Cited

U.S. PATENT DOCUMENTS

2007/0268534 A1* 11/2007 Duan et al. ..................... 358/520
2010/0246954 A1*  9/2010 Kim et al. ...................... 382/170

* cited by examiner

*Primary Examiner* — Christopher K Peterson
(74) *Attorney, Agent, or Firm* — Wong, Cabello, Lutsch, Rutherford & Brucculeri, LLP

(57) ABSTRACT

Systems, methods, and computer readable media expounding "Structure Histograms" and their use are presented. Structure Histograms may be described as histograms whose individual entries (values) express a functional relationship between a given pixel (or group of pixels) and its neighboring pixels. As such, Structure Histograms capture information about the structure of an image in so far as they record information related to the relative placement of pixels within an image (e.g., are pixels of a common value closely spaced or spaced far apart). Structure Histograms may be generated from tonal pixel values (e.g., red, green and blue values), luminance pixel values (e.g., gray scale pixel values) or cross-channel pixel values (e.g., red-luminance, green-blue, or green-blue-luminance pixel values). Structure Histograms may be used in a number of image processing contexts such as, for example, automated image enhancement operations.

31 Claims, 9 Drawing Sheets

US 8,970,739 B2

DEVICES AND METHODS FOR CREATING STRUCTURE HISTOGRAMS FOR USE IN IMAGE ENHANCEMENT

BACKGROUND

This disclosure relates generally to the field of image processing. More particularly, this disclosure relates to a technique for enhancing images using a novel type of histogram referred to herein as a Structure Histogram.

Image enhancement may be thought of the process of altering an image to make it more aesthetically pleasing. Illustrative image enhancement operations include those that correct color hue and brightness imbalances as well as other image editing features, such as red eye removal, sharpness adjustments, zoom features and automatic cropping. Common to many of these operations is the use of histograms. Conventional image histograms provide a graphical representation of the distribution of pixel values in an image. Referring to FIG. 1, normalized conventional histogram 100 for an 8-level gray scale image having pixel values between 0 and 7 is shown. (As used here, the term "normalized" refers to the case where histogram entries, or bin values, have been adjusted so that the area under the histogram is equal 1.0.) Histogram 100 shows that 50% of the pixels have a gray scale value of 2, 20% of the pixels have gray scale values of 3 another 20% have a gray scale value of 4, and 10% of the pixels have a gray scale value of 7.

Conventional histograms such as histogram 100 are, by definition, completely insensitive to the ordering of pixels in an image. (See discussion below with regards to Table 1.) For example, FIG. 2A shows gray scale image 200 of a baby, FIG. 2B shows the corresponding conventional histogram 205, and FIG. 2C shows image 210 that results from ordering/sorting the pixels that make up image 200 (e.g., from smallest/darkest to largest/brightest). Because images 200 and 210 are composed of the same pixels, their histograms are identical (see conventional histogram 205). The images are, however, clearly different and the person capturing the images would presumably want to enhance the images differently. While conventional histograms may be well-suited to aid in some enhancement operations, FIG. 2 illustrates the difficulty of relying on them to perform all image enhancement operations.

SUMMARY

One set of embodiments provide devices, computer or processor executable instructions, and methods to generate and use a novel image statistic (a Structure Histogram) to process images during, for example, automatic image enhancement operations. One implementation may include selecting a first pixel from an image, the value of which corresponds to a first entry in a Structure Histogram, identifying a neighbor pixel of the first pixel, the value of which corresponds to a second entry in the Structure Histogram, updating each of the Structure Histogram's entries between the first and second Structure Histogram entries, generating filter parameter values based, at least in part, on the Structure Histogram, and enhancing the image based, at least in part, on the filter parameter values.

Another implementation may include selecting a first pixel from an image, the value of which corresponds to a first entry in a Structure Histogram, identifying more than one neighbor pixel of the first pixel, the value of each corresponding to additional entries in the Structure Histogram, updating each Structure Histogram entry between the entry corresponding to the first entry and each of the additional entries, and using the Structure Histogram to modify the image.

Structure Histogram entries may be updated using any desired function (e.g., incrementing). In addition, an image modified or enhanced in accordance with this disclosure may be stored in any desired format such as RAW, JPEG, TIFF and the like. Further, operations in accordance with this disclosure may be applied to all, or some, pixels in an image. Still further, the Structure Histogram may be applied to luminance, chroma or cross-channel image information.

DETAILED DESCRIPTION

Figure 1:
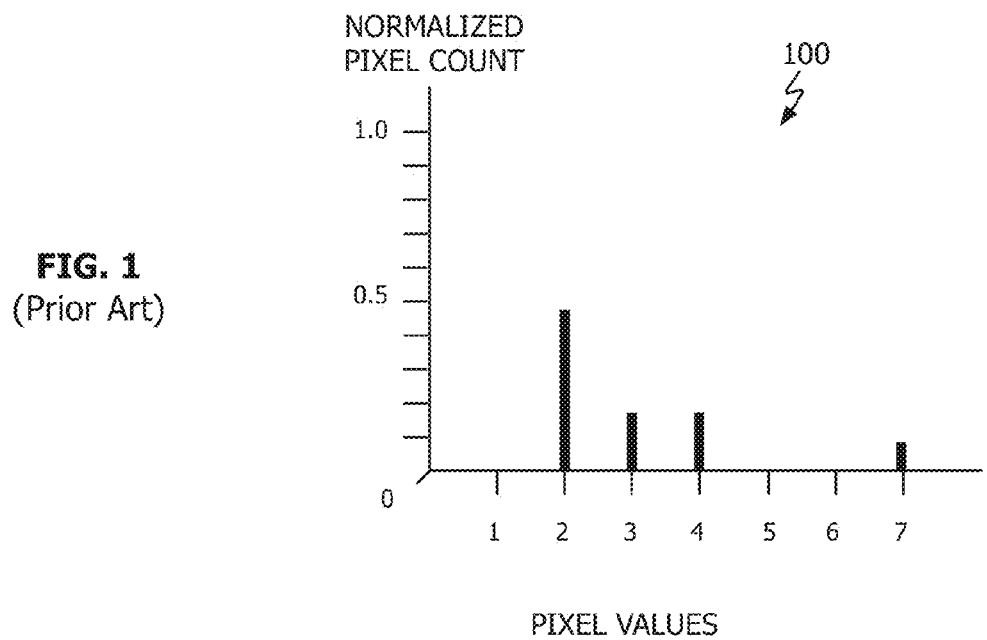
FIG. 1 shows an illustrative conventional histogram.

This disclosure pertains to systems, methods, and computer readable media that describe a "Structure Histogram" and its use. Structure Histograms may be described as histograms whose individual entries (values) express a functional relationship between a given pixel (or group of pixels) and its neighboring pixels. As such, Structure Histograms capture information about the structure of an image in so far as they record information related to the relative placement of pixels within an image (e.g., are pixels of a common value closely spaced or spaced far apart). Structure Histograms may be generated from tonal pixel values (e.g., red, green and blue values), luminance pixel values (e.g., gray scale pixel values) or cross-channel pixel values (e.g., red-luminance, green-blue, or green-blue-luminance pixel values). The latter approach may be beneficial in statistical learning embodiments. The use of Structure Histograms is described below in the context of image enhancement operations performed on a portable image capture device. Use of Structure Histograms for image processing operations is not, of course, so limited. Image capture devices include any electronic device capable of capturing a digital image such as stand-along digital cameras and personal digital assistants, mobile telephones, personal music/video payers and portable computers having embedded image capture units.

In the following description, for purposes of explanation, numerous specific details are set forth in order to provide a thorough understanding of the inventive concept. As part of this description, some of this disclosure's drawings represent structures and devices in block diagram form in order to avoid obscuring the invention. In the interest of clarity, not all features of an actual implementation are described. Moreover, the language used in this disclosure has been principally selected for readability and instructional purposes, and may not have been selected to delineate or circumscribe the inventive subject matter, resort to the claims being necessary to determine such inventive subject matter. Reference in this disclosure to "one embodiment" or to "an embodiment" means that a particular feature, structure, or characteristic described in connection with the embodiment is included in at least one embodiment of the invention, and multiple references to "one embodiment" or "an embodiment" should not be understood as necessarily all referring to the same embodiment.

It will be appreciated that in the development of any actual implementation (as in any development project), numerous decisions must be made to achieve the developers' specific goals (e.g., compliance with system- and business-related constraints), and that these goals will vary from one implementation to another. It will also be appreciated that such development efforts might be complex and time-consuming, but would nevertheless be a routine undertaking for those of ordinary skill in the design of image processing hardware and software having the benefit of this disclosure.

Conventional histogram 205 was generated based on gray scale images 200 or 210 and in accordance with the pseudocode shown in Table 1. In generating a conventional histogram (e.g., histogram 205) each pixel value in an image (e.g., image 200 and 210) is evaluated is isolation. That is, conventional histograms evaluate each pixel's value without taking into account the values of other pixels in the image. This is clearly borne out by Table 1's pseudocode.

TABLE 1

Conventional Histogram Pseudocode

```
int histogram[256] = 0 // define a histogram having 256
int count = 0 // elements or bins
for p in image // for each pixel in an image do . . .
    histogram[p ] += 1
    count += 1
end "p" (pixel) loop
```

In contrast, a Structure Histogram in accordance with this disclosure may be generated by taking into account the values of a pixel's "neighboring" pixels—its neighborhood. One embodiment of this approach is manifest by the pseudocode provided in Table 2.

TABLE 2

Illustrative Border Histogram Pseudocode

```
int histogram[256] = 0 // define a histogram having 256
int count = 0 // elements or bins
int I = 0
for p in image // for each pixel in an image do . . .
    for n of p // for each neighbor pixel do . . .
    // increment the value of each histogram element
    // between p and its neighbor pixel n
        for i = { min(p, n ) + 1} to { max(p, n) - 1 } // do . . .
            histogram [i ] += 1
            count += 1
        end "i" loop // bins between p and n pixels
    end "n" (neighbor) loop
end "p" (pixel) loop
```

Several points may be made about Table 2's pseudocode. First, the value of each histogram element (e.g., each of the 256 "bins" that define the illustrative histogram) is dependent upon how different a pixel's value is from its neighboring pixels. In another embodiment, the similarity or other functional relationship between the two pixels may be used. In Table 2, each histogram bin between the selected pixel's value and the selected neighbor pixel's value is incremented. For example, if the selected pixel's value is 76 and one of its neighbor pixel's value is 244, each of the 167 bins (i.e., bins 77 through 243) would be incremented. It should be understood that this bin update approach is purely illustrative. For any given implementation a designer may determine that another function (linear or non-linear) is more appropriate to capture the difference between a pixel and its neighboring pixels. By way of example, the start and end bins may also be updated (e.g., bins 76 and 244).

Second, the time complexity of generating a Structure Histogram is, at worse: $(D^2 \times L)$, where "D" represents the image's dimension (i.e., the image's row-by-column size), and "L" represents the number of values a histogram element may assume (in the embodiment of Table 2, "L" would be 256). In natural images (e.g., images of real objects such as scenery or faces), it has been found that a single pixel neighborhood (e.g., the right-most or lower-most neighboring pixel) provides excellent results during image enhancement operations (e.g., improving an image's highlights and/or shadow regions). In these situations, generation of a Structure Histogram has the same time complexity on a solid color image as a conventional histogram. Further, since the part of the algorithm described in Table 2 having complexity L involves incrementing all of the Structure Histogram's bins between values (identified by a specified pixel's value and the value of the specified pixel's neighbor pixel), the start and end points of the incrementing operation may be recorded for all pixel pairs. Once this is done, all bin incrementing may be accomplished in a single pass over the Structure Histogram's bin array leading to a complexity of $(D^2 \times L)$—a process completely dominated by the &term in the case of typical images. This recognition makes generation of Structure Histograms only slightly more costly (in term of time and processor resources) than conventional histograms.

Third, the "count" variable in Table 2 no longer identifies the total number of pixels in an image as in a conventional histogram (see Table 1). Rather, a Structure Histogram's count provides a measure of an image's complexity. As shown in the illustrative pseudocode of Table 2, the variable count is incremented by the numerical difference between every evaluated pixel in an image and each of that pixel's neighboring pixels. As implied by the previous sentence, the generation of a Structure Histogram does not require that every pixel in an image be evaluated. In one embodiment for example, an initial image may be down-sampled and the down-sampled image's pixels evaluated. In another embodiment, every second, third, . . . pixel in an image may be evaluated during Structure Histogram generation. In yet another embodiment, a specified pattern of pixels in an image may be evaluated. In still another embodiment, a specified number of pixels in an image may be evaluated (e.g., 75% or 50% of an image's pixels).

Figure 3A:
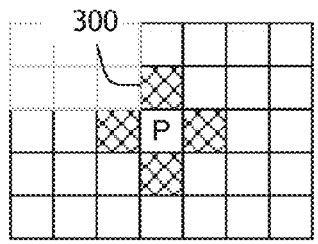
FIGS. 3A-3D show illustrative pixel neighborhoods in accordance with various embodiments.
Figure 3B:
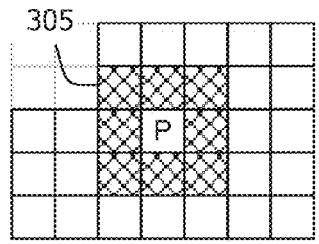
Figure 3C:
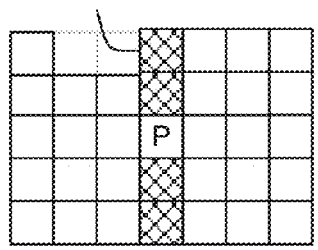
Figure 3D:
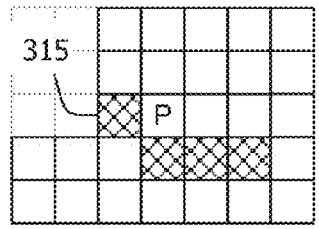

Fourth, a pixel's neighborhood may be defined as any one or more pixels in a designated pattern. A number of illustrative neighborhoods are illustrated in FIGS. 3A through 3D. In FIG. 3A, neighborhood 300 for pixel "P" may be defined as its four (4) compass pixels (identified by cross-hatching). In FIG. 3B, neighborhood 305 for pixel P may be defined by all of its 8 immediately adjacent pixels (identified by cross-hatching). In FIG. 3C, neighborhood 310 for pixel P may be defined by 4 pixels—two above and two below (identified by cross-hatching). In FIG. 3D, neighborhood 315 for pixel P may be defined in a non-symmetrical manner as shown by the cross-hatched pixels.

Figure 4:
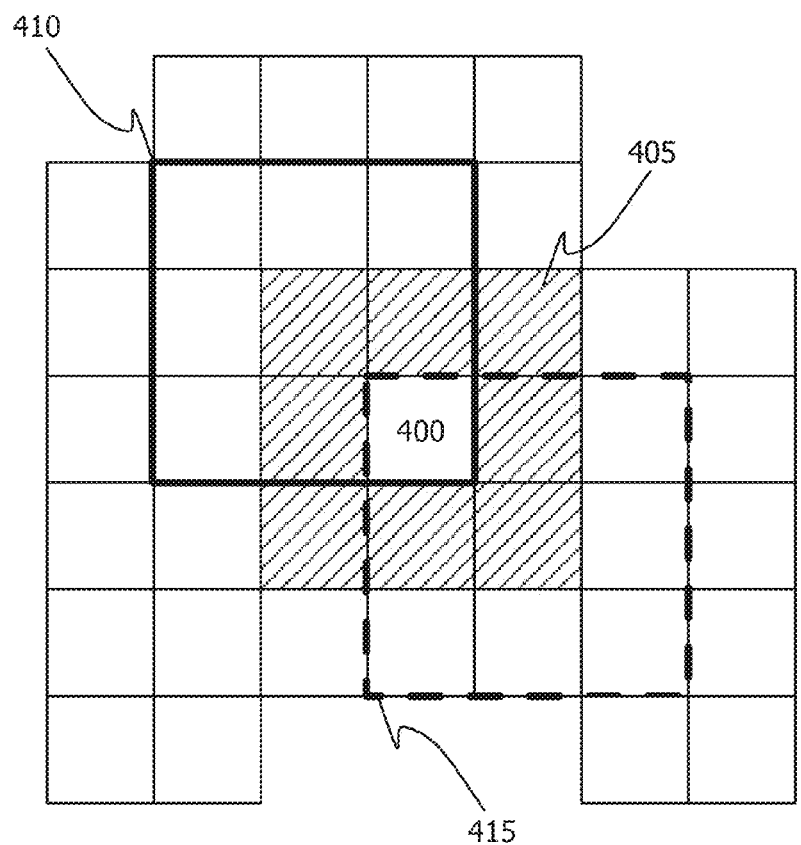
FIG. 4 shows an illustrative pixel unit in accordance with one embodiment.

Fifth, the designated pixel may be but one pixel in a group of pixels referred to here as a "pixel unit." A neighbor region may then be chosen based on some relationship between it and the designated pixel unit. By way of example, consider FIG. 4. As shown there, designated pixel 400 may form the center pixel in pixel unit 405. Other pixel units 410 and 415 may be defined surrounding pixel unit 405. In one embodiment that pixel unit having the most different value from that of pixel unit 405 can be chosen as the "neighborhood." In another embodiment, that pixel unit that most closely matches the value of pixel unit 405 may be chosen. In yet another embodiment, one or more additional pixel units may be defined about pixel 400. For example, one additional pixel unit may comprise the same number of pixels as pixel unit 405 and enclose pixel 400 in its lower left corner while another pixel unit may enclose pixel 400 in its upper right corner. As used here, the "value" of a pixel unit may be any suitable metric. Such metrics include, but are not limited to, sum of all pixel values in the designated pixel unit, sum of the absolute difference between the selected pixel and each pixel in the designated pixel unit, the sum of the squares of each pixel in the designated pixel unit, the maximum pixel value in the enclosed region, the minimum pixel value in the enclosed region, or the mean/median/standard deviation of a unit's pixel values. It should be noted that the shape of a pixel unit need no be square. Further, the region surrounding a pixel currently being processed (e.g., designated pixel 400) need not have the same number of pixels or be the same shape as "other" regions. In some embodiments, the shape and size of a pixel unit may depend upon where on the pixel array the pixel being evaluated is located (e.g., pixel 400).

Figure 5:
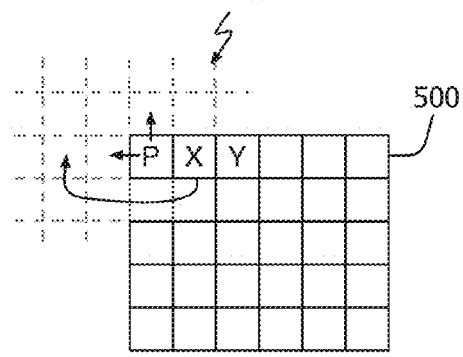
FIG. 5 shows a pixel neighborhood mirroring operation in accordance with one embodiment.

Unlike conventional histograms, neighborhood boundary conditions may need to be addressed during Structure Histogram generation. Boundary events occur when one or more of a pixel's neighborhood pixels do not exist. This can happen, for example, at an image's edge. Referring to FIG. 5, image pixel array 500 includes pixels "P," "X," and "Y." If pixel P is being evaluated and its neighborhood is defined as the two pixels to its immediate right (pixels X and Y) and two pixels to its immediate left, there is a problem in that pixel P does not have any pixels to its immediate left. In this case, pixel P's neighborhood is said to be incomplete. In one embodiment, pixels that do not have a complete neighborhood may be passed over when generating a Structure Histogram. In another embodiment, missing neighborhood pixel values may be synthesized by "mirroring" or extending the image. For example, to complete the neighborhood defined above using this technique, pixels P and X may be mirrored onto imaginary pixel array 505 to create the illusion that the required pixels are present. As shown, pixel P's value and pixel X's values may be copied or mirrored into imaginary pixel array 505. Once this is done, calculation of the Structure Histogram may proceed as normal.

Figure 6A:
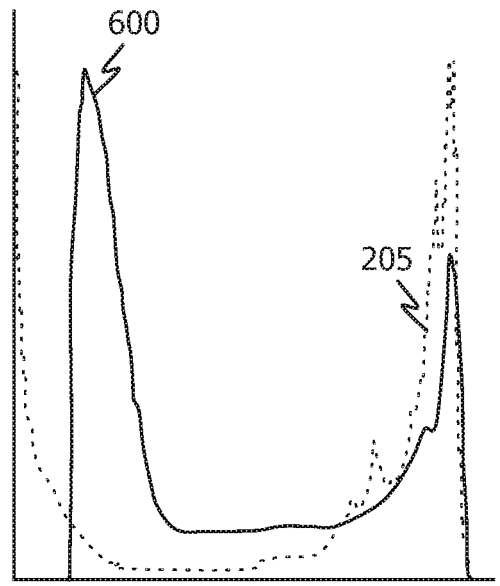
FIG. 6 shows illustrates the difference between Structure Histograms and conventional histograms in accordance with one embodiment.
Figure 6B:
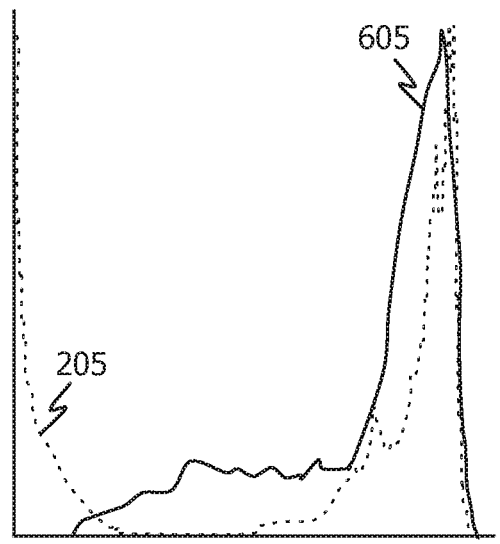

Referring to FIG. 6, in one embodiment the difference between Structure Histogram 600 and conventional histogram 205 for image 200 is shown. Similarly, FIG. 6B illustrates the difference between Structure Histogram 605 and conventional histogram 205 for image 210. It is clear from FIG. 6 that the Structure Histogram captures the difference between the two example images 200 and 210 (whereas conventional histogram 205 does not). This is because structure histograms capture information related to the relative placement of pixels within an image (see discussion above).

Figure 7:
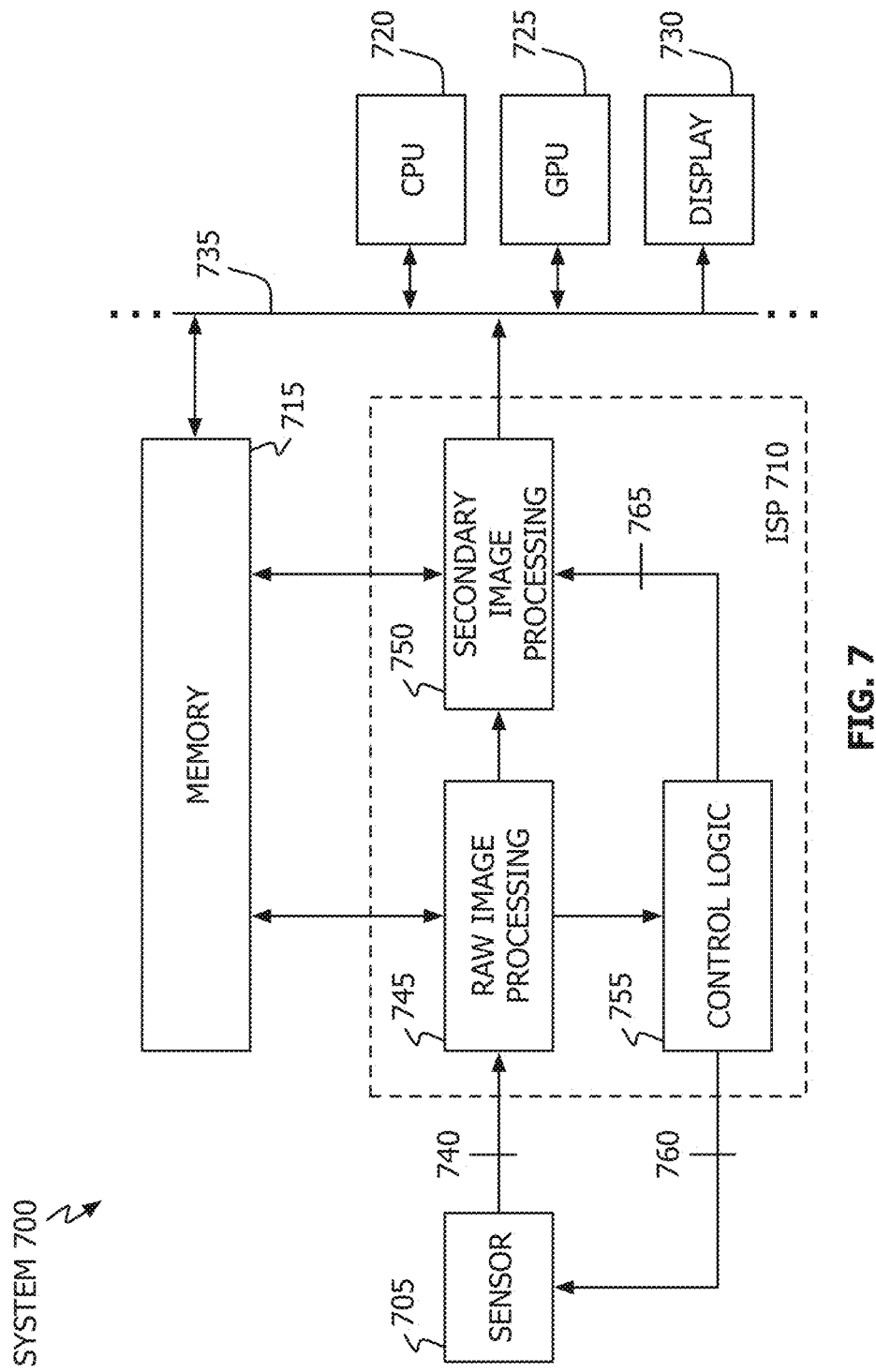
FIG. 7 shows, in block diagram form, an image processing system in accordance with one embodiment.

Referring to FIG. 7, Structure Histograms in accordance with this disclosure may be used in illustrative image processing system 700. As shown, system 700 may include one or more image sensor units 705, one or more image sensor packages (ISP) 710, memory 715, one or more central processing units (CPUs) 720, one or more special purpose graphics processing units (GPUs) 725, one or more display units 730 and communication bus 735. Image sensor unit 705 may include a color filter array (e.g., a Bayer filter) and may thus provide both light intensity and wavelength or chroma information to provide raw image data 740 that may be processed by ISP 710. In general, ISP 710, CPU 720 and GPU 725 may generally be referred to as processing units, programmable processing units or, simply, processors.

In the illustrative embodiment, ISP 710 may itself include raw image processing unit 745, secondary image processing unit 750 and control unit 755. Unit 745 may process raw image data 740 on a pixel-by-pixel basis in a number of formats. For example, each image pixel may have a bit-depth of 8, 10, 12, or 14 bits. Raw image processing unit 745 may perform one or more image processing operations on raw image data 740, as well as collect statistics about the image data. Image processing operations and the collection of statistical data may be performed at the same or at different bit-depth precisions than that provided by raw image data 740. In one embodiment, processing raw image data 740 may be done at a precision of 14-bits. In such embodiments, raw image data 740 has a bit-depth less than 14 bits (e.g., 8-bits, 10-bits, or 12-bits), the data may be up-sampled to 14-bits. In another embodiment, raw image processing unit 745 may operate at a precision of 8-bits and, thus, raw image data 740 having a higher bit-depth may be down-sampled to an 8-bit format. Raw image processing unit 745 may also perform one or more image processing operations, such as temporal filtering and/or binning compensation filtering.

Secondary image processing unit 750 may provide additional image processing in the raw domain (e.g., defective pixel detection and correction, lens shading correction, demosaicing, and applying gains for auto-white balance and/or setting a black level), RGB processing (e.g., various color adjustment operations, application of color gains for auto-white balancing and tone mapping, and color space conversion), and YCbCr processing (e.g., scaling, chroma suppression, luma sharpening, brightness, contrast, YCbCr gamma mapping, and chroma decimation). Image data generated by Secondary image processing unit 750 may be sent to CPU 720, GPU 725, or display 730. In addition, secondary image processing unit 750 may include a compression/decompression engine (not shown) for encoding and decoding image data. By way of example, the compression engine or "encoder" may be a JPEG compression engine for encoding still images or an H.264 compression engine for encoding video images, or some combination thereof (as well as corresponding decompression or decoder engines).

Control unit 755 may receive information from raw image processing unit 745. Such information may include, for example, image sensor statistics relating to auto-exposure, auto-white balance, auto-focus, flicker detection, black level compensation, lens shading correction, and so forth. Control unit 755 may include a processor and/or microcontroller configured to execute one or more routines (e.g., firmware) that may be configured to determine, based on information received from unit 745, control parameters 760 for image sensor unit 705, as well as control parameters 765 for secondary image processing unit 750. By way of example only, control parameters 760 may include sensor control parameters (e.g., gains, integration time for exposure control), camera flash control parameters, lens control parameters (e.g., focal length for focusing or zoom), or a combination of such parameters. Illustrative control parameters 765 include, but are not limited to, gain levels and color correction matrix (CCM) coefficients for auto-white balance and color adjustment (e.g., during RGB processing), as well as lens shading correction parameters.

As also shown, image sensor unit 705, raw image processing unit 745, secondary image processing unit 750, CPUs 720 and GPUs 725 may also access memory 715. In this manner, any of these units may obtain and process data that was not contemporaneously generated by image sensor unit 705. Memory 715 may include one or more volatile and/or one or more non-volatile memory units.

As noted above, Structure Histograms may be used in image processing system 700 for a variety of tasks. In practice, image processing system 700 may generate a series of image statistics such as, for example, Structure Histograms, conventional histograms, color correction matrix coefficients, and lens shading correction parameters. These values may be used to generate image filter parameters that, when applied to an image, enhance its presentation.

Figure 8:
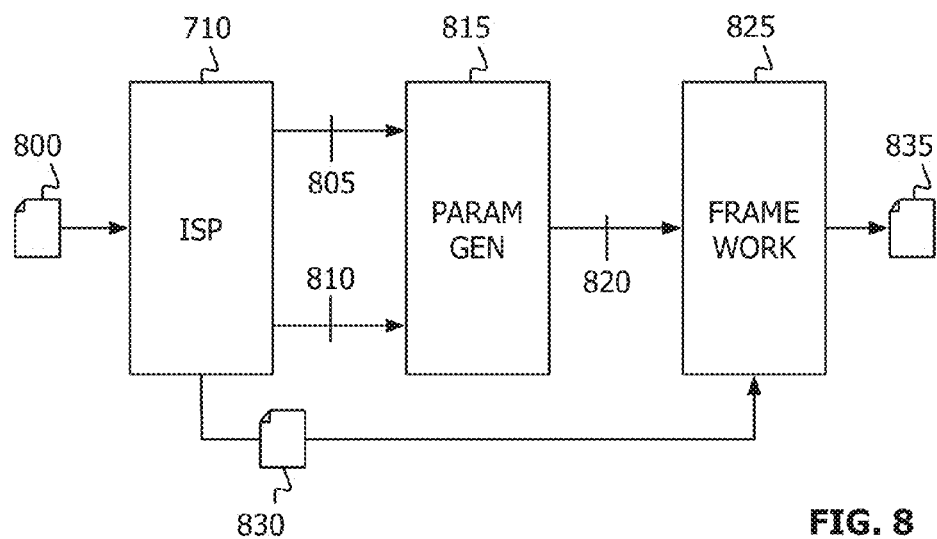
FIG. 8 shows, in block diagram form, an image processing pipeline in accordance with another embodiment.
Figure 2A:
FIG. 2 shows two gray scale images (FIGS. 2A and 2C) that have the same conventional histogram (FIG. 2B).
Figure 2B:
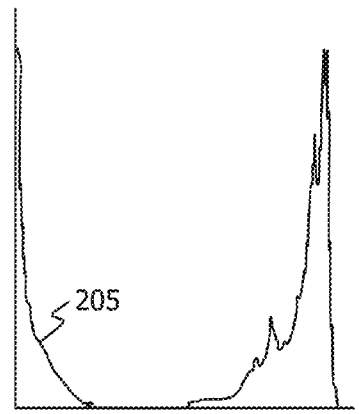
Figure 2C:
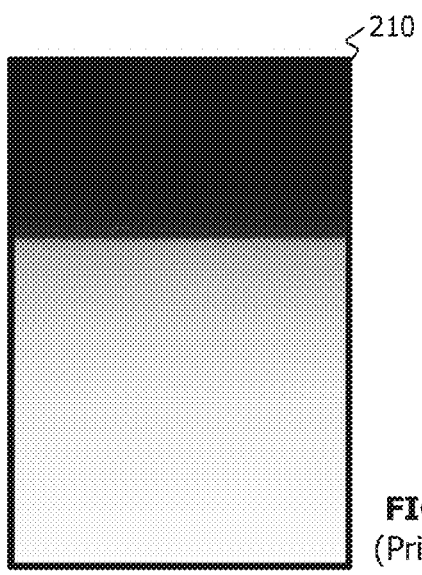

Referring to FIG. 8, image 800 may be supplied to ISP 710 which, in turn, generates the image's Structure Histogram 805 as well as other image statistics 810 such as one or more conventional histograms, mean, median and standard deviation. Image statistics 805 and 810 may be supplied to parameter generator 815 which, based on inputs 805 and 810, generates input parameter values 820 for one or more filter functions within framework 825. Each of the one or more filter functions may be applied to image 830 to generate enhanced image 835.

In one embodiment, Structure Histograms may be used to enhance an image's highlights/shadows through the use of an operating system supplied library or framework. An example of one such framework is the Core Image framework from Apple Inc. In an embodiment making use of Apple's Core Image framework, parameters 820 may be those used by the CIHighlightShadowAdjust filter. This filter adjusts the tonal mapping of an image while preserving its spatial detail. Table 3 identifies the input parameters for the CIHighlightShadowAdjust filter (some, or all of which, may be supplied by parameter generator 815 via inputs 820).

TABLE 3

CIHighlightShadowAdjust Filter Input Parameters

| Parameter | Description |
| --- | --- |
| inputImage | A class object that represents an image. |
| inputHighlightAmount | A numeric value between 0.0 and 1.0 that specifies the amount of highlight to apply to the inputImage. |
| inputShadowAmount | A numeric value between 0.0 and 1.0 that specifies the amount of shadow to apply to the inputImage. |

In the embodiment begun above, image 800's Structure Histogram 805 may be used to generate a value for the CIHighlightShadowAdjust filter's inputShadowAmount parameter. It will be recognized that the exact computation of such a parameter will be system-dependent and can vary from one implementation to another. In the image processing field, there are generally no theoretical means to determine filter input parameter values such as inputShadowAmount. This is true because each person, developer and organization has its own thoughts about what makes an image more aesthetically pleasing. Accordingly, in one embodiment a large number of images may be reviewed and their composition modified to obtain the most "pleasing" appearance (as determined by the party performing the analysis). The filter parameter values needed to obtain the "pleasing" images may be used to empirically determine an equation (e.g., via best-fit techniques) that, when presented with one or more image descriptors (e.g., a Structure Histogram), generate filter parameter values.

Figure 9:
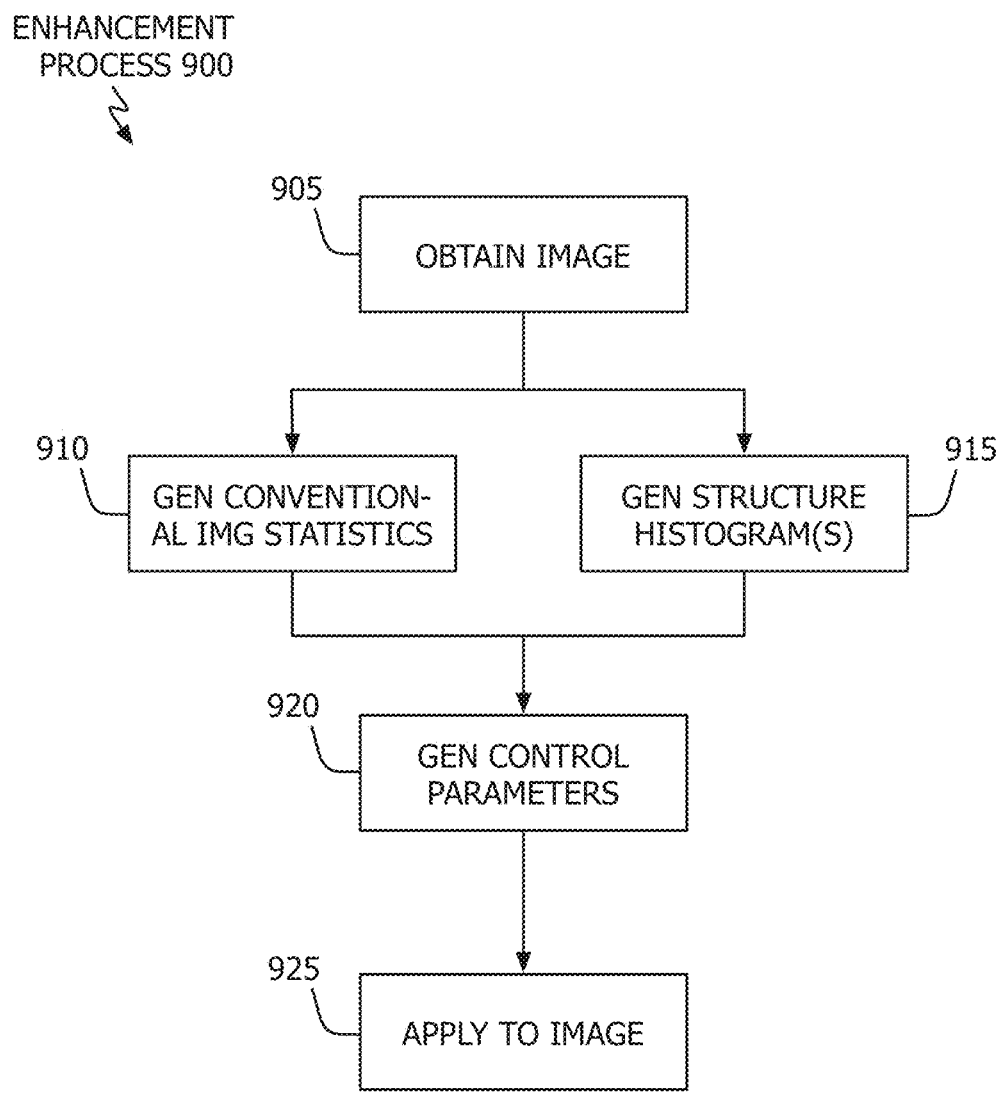
FIG. 9 shows, in flowchart form, an image enhancement operation in accordance with one embodiment.

Referring to FIG. 9, enhancement process 900 in accordance with one embodiment begins by obtaining an image (block 905) which may then be used to generate image statistics: conventional histograms (block 910) and one or more Structure Histograms (block 915). Conventional image statics may include, but are not limited to, data related to the image's saturation, vibrancy, color composition, brightness, contrast, black level, and lens shading. The Structure Histogram(s) and zero or more conventional statistics may be applied to a parameter generator as discussed above to obtain values for various image control parameters (block 920). For example, in an Apple OS X® operating environment utilizing the Core Image framework, one such image control parameter is the inputShadowAmount filter parameter for the CIHighlightShadowAdjust filter. (OS X is a registered trademark of Apple Inc.) With the necessary control parameter values known, various image processing operations (e.g., filters) may be applied to the image (block 925).

Figure 10:
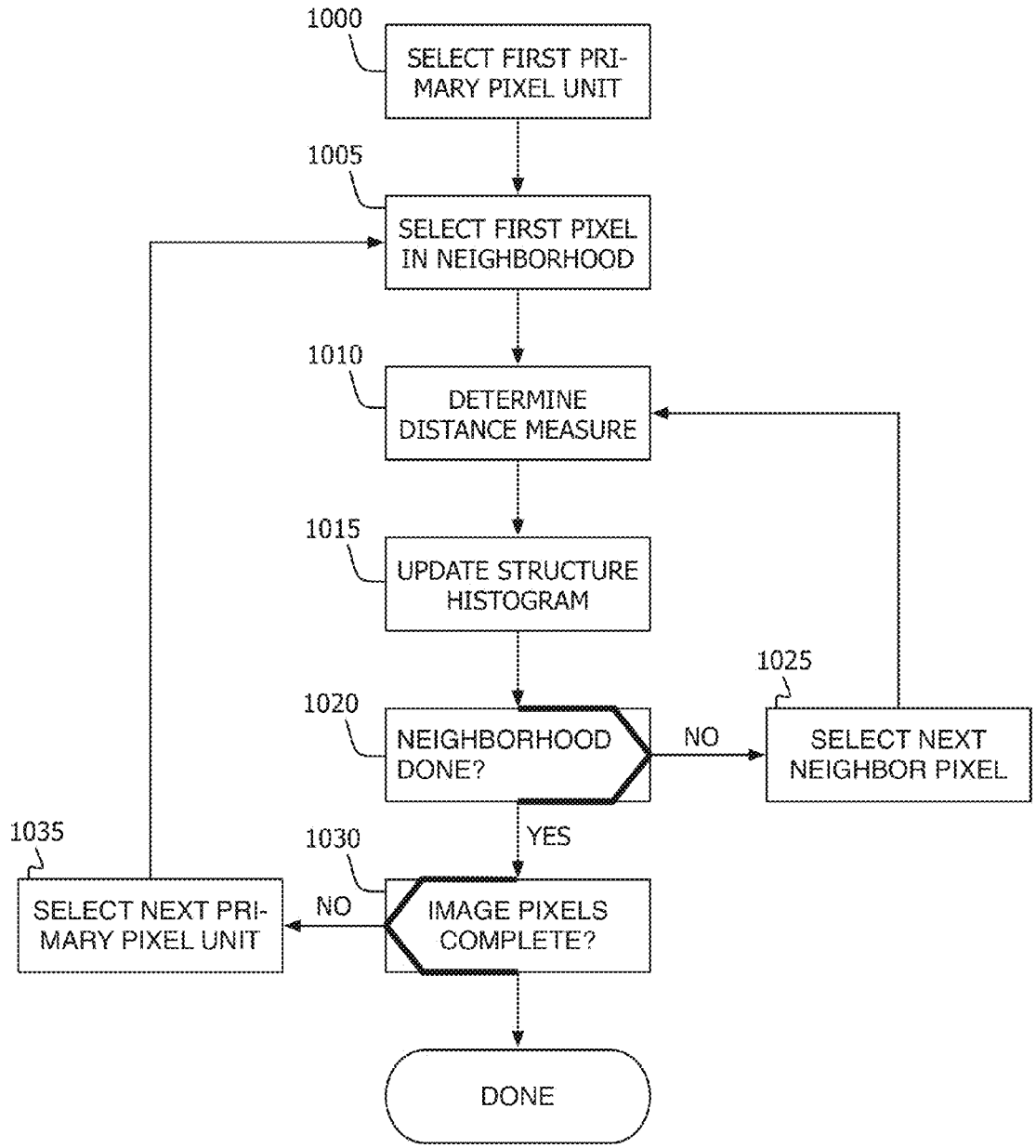
FIG. 10 shows, in flowchart form, a Structure Histogram generation process in accordance with one embodiment.

Referring to FIG. 10, in one embodiment Structure Histogram generation operation 915 begins by selecting a first primary pixel unit from the image obtained in accordance with block 905 (block 1000). A neighborhood for the selected primary pixel unit may then be determined, and a first (neighbor) pixel from this neighborhood selected (block 1005). A distance measure between the primary and neighbor pixels may then be generated (block 1010). It will be recognized that operations in accordance with block 1010 are not limited to "distance" measures (e.g., a Hamming distance), but may be any function selected by the designer that accentuates a difference between the values of the selected primary and neighbor pixels. Based on the calculated distance measure, one or more bins within the Structure Histogram may be updated (block 1015). If additional pixels in the image's selected primary pixel's neighborhood remain to be evaluated (the "NO" prong of block 1025), another neighbor pixel may be selected (block 1025), whereafter processing continues at block 1010. If all pixels in the image's selected primary pixel's neighborhood have been evaluated (the "YES" prong of block 1025), a further check can be made to determine if all of the pixels within the image slated for evaluation—e.g., primary pixels—have been processed (block 1030). If at least one such pixel has not yet been processed (the "NO" prong of block 1030), the next (primary) pixel from the image may be selected (block 1035), whereafter processing continues at block 1005.

Figure 11:
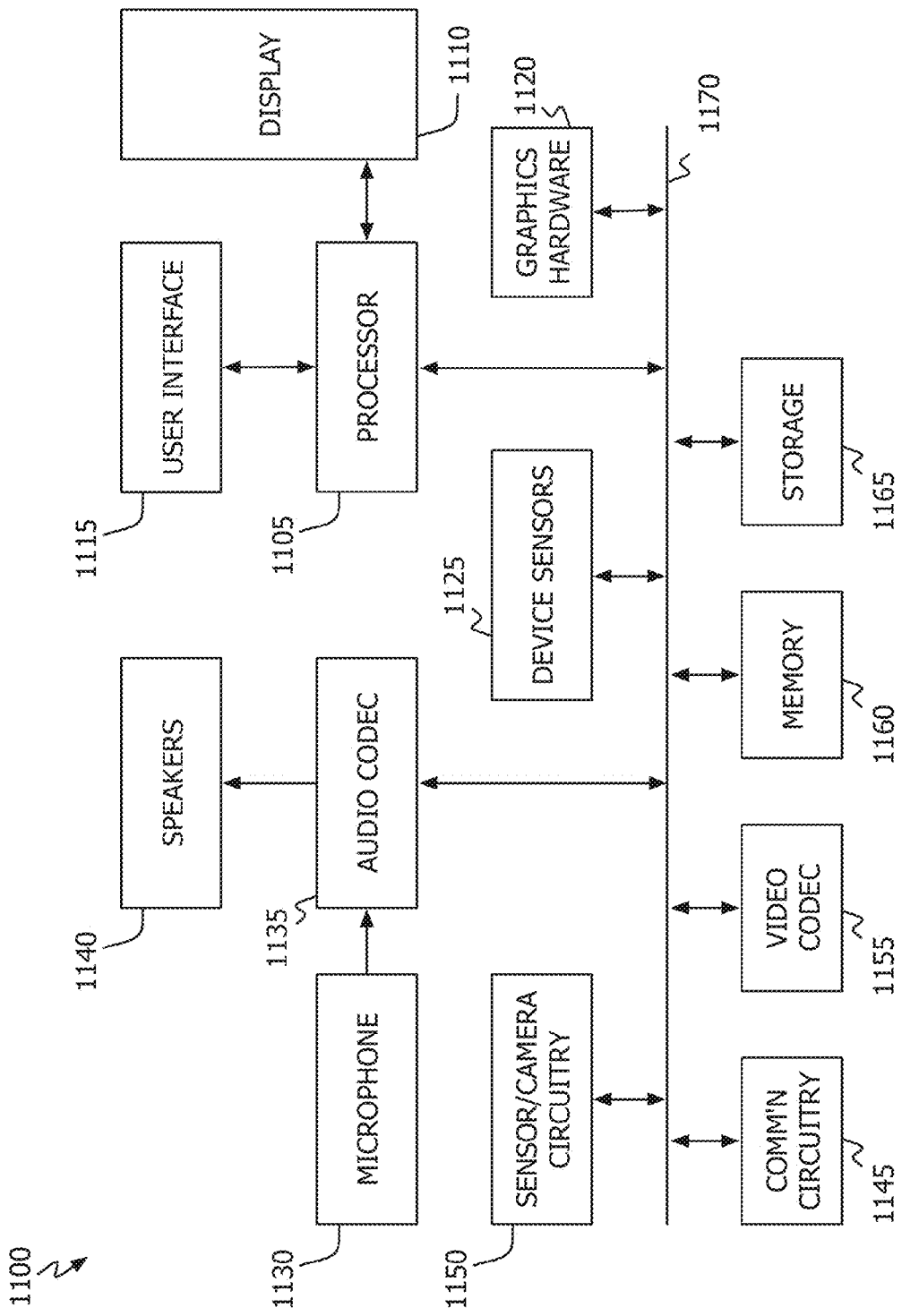
FIG. 11 shows, in block diagram form, an illustrative electronic device in accordance with one embodiment.

As previously noted, structure histogram process 900 and related system 700 may be implemented as part of an electronic device. Illustrative devices include, but are not limited to, mobile phones, personal digital assistants, personal music/video players, and laptop, tablet and desktop computer systems. Referring to FIG. 11, a simplified functional block diagram of illustrative electronic device 1100 is shown according to one embodiment. Electronic device 1100 may include processor 1105, display 1110, user interface 1115, graphics hardware 1120, device sensors 1125 (e.g., proximity sensor/ambient light sensor, accelerometer and/or gyroscope), microphone 1130, audio codec(s) 1135, speaker(s) 1140, communications circuitry 1145, digital image capture unit 1150, video codec(s) 1155, memory 1160, storage 1165, and communications bus 1170.

Processor 1105 may execute instructions necessary to carry out or control the operation of many functions performed by device 1100 (e.g., such as the generation and/or processing of images using Structured Histograms). Processor 1105 may, for instance, drive display 1110 and receive user input from user interface 1115. User interface 1115 may allow a user to interact with device 1100. For example, user interface 1115 can take a variety of forms, such as a button, keypad, dial, a click wheel, keyboard, display screen and/or a touch screen. Processor 1105 may also, for example, be a system-on-chip such as those found in mobile devices and include a dedicated graphics processing unit (GPU). Processor 1105 may be based on reduced instruction-set computer (RISC) or complex instruction-set computer (CISC) architectures or any other suitable architecture and may include one or more processing cores. Graphics hardware 1120 may be special purpose computational hardware for processing graphics and/or assisting processor 1105 to process graphics information including the generation and use of Structure Histograms. In one embodiment, graphics hardware 1120 may include a programmable graphics processing unit (GPU).

Sensor and camera circuitry 1150 may capture still and video images that may be processed, at least in part, by video codec(s) 1155 and/or processor 1105 and/or graphics hardware 1120, and/or a dedicated image processing unit incorporated within circuitry 1150. By way of example, circuitry 1150 may incorporate some or all of ISP 710 including at least some of memory 715. Captured images may be stored in memory 1160 and/or storage 1165—either or both of which may also incorporate part of memory 715. Memory 1160 may include one or more different types of media used by processor 1105 and graphics hardware 1120 to perform device functions. For example, memory 1160 may include memory cache, read-only memory (ROM), and/or random access memory (RAM). Storage 1165 may store media (e.g., audio, image and video files), computer program instructions or software, preference information, device profile information, and any other suitable data, including images captured by sensor/camera circuitry 1150. Storage 1165 may include one more non-transitory storage mediums including, for example, magnetic disks (fixed, floppy, and removable) and tape, optical media such as CD-ROMs and digital video disks (DVDs), and semiconductor memory devices such as Electrically Programmable Read-Only Memory (EPROM), and Electrically Erasable Programmable Read-Only Memory (EEPROM). Memory 1160 and storage 1165 may be used to tangibly retain computer program instructions or code organized into one or more modules and written in any desired computer programming language. When executed by, for example, processor 1105 such computer program code may implement one or more of the methods described herein.

It is to be understood that the above description is intended to be illustrative, and not restrictive. The material has been presented to enable any person skilled in the art to make and use the invention as claimed and is provided in the context of particular embodiments, variations of which will be readily apparent to those skilled in the art (e.g., some of the disclosed embodiments may be used in combination with each other). Many other embodiments will be apparent to those of skill in the art upon reviewing the above description. For example, a Structure Histogram may be generated based on the evaluation of any pixel array. There is no need for the pixels to have any particular form (e.g., RAW versus RGB versus YCbCr). In addition, any filter or other image processing operation control parameter may benefit from use of Structure Histograms—its use is not limited to the CIHighlightShadowAdjust filter, the Apple OS X, or the Apple Core Image Framework. It should also be understood that the image processing systems described with respect to FIGS. 7 and 8 may be implemented in conventional hardware (e.g., CPU 720) or firmware executing on custom hardware (e.g., ISP 710). It is further noted that histogram update operations are not limited to a functional relationship between two individual pixel values. In those embodiments in which multi-pixel pixel units are defined, a metric for one or all pixel units may form the basis of histogram entry update operations. For example, pixel unit mean or median values may function as single pixel values. Accordingly, the scope of the invention therefore should be determined with reference to the appended claims, along with the full scope of equivalents to which such claims are entitled. In the appended claims, the terms "including" and "in which" are used as the plain-English equivalents of the respective terms "comprising" and "wherein."

The invention claimed is:

1. A non-transitory program storage device, readable by a processor and comprising instructions stored thereon to cause the processor to:
    obtain an image having pixels;
    select, from the pixels, a first pixel having a first pixel value, the first pixel value corresponding to a first entry of a histogram;
    identify, from the pixels, a neighbor pixel having a neighbor pixel value, the neighbor pixel value corresponding to a second entry in the histogram;
    update each histogram entry between the first and second entries of the histogram;
    generate one or more filter parameter values based, at least in part, on the histogram; and
    enhance the image based, at least in part, on the one or more filter parameter values.

2. The non-transitory program storage device of claim 1, wherein the instructions to cause the processor to obtain an image comprise instructions to cause the processor to obtain an image that is a scaled-down version of another image.

3. The non-transitory program storage device of claim 1, wherein the instructions to cause the processor to obtain an image comprise instructions to cause the processor to obtain luminance channel information of an image.

4. The non-transitory program storage device of claim 1, wherein the instructions to cause the processor to identify a neighbor pixel comprise instructions to cause the processor to identify a pixel that is immediately adjacent to the first pixel.

5. The non-transitory program storage device of claim 1, wherein the instructions to cause the processor to update each histogram entry comprise instructions to cause the processor to increment each histogram entry between the first and second entries of the histogram.

6. The non-transitory program storage device of claim 5, further comprising instructions to cause the processor to increment the first and second entries of the histogram.

7. The non-transitory program storage device of claim 1, wherein the instructions to cause the processor to enhance the image further comprise instructions to cause the processor to store the enhanced image in a memory.

8. An image processing method, comprising:
    obtaining an image having pixels;
    selecting, from the pixels, a first pixel having a first pixel value, the first pixel value corresponding to a first entry of a histogram;
    identifying, from the pixels, a neighbor pixel having a neighbor pixel value, the neighbor pixel value corresponding to a second entry in the histogram;

updating each histogram entry between the first and second entries of the histogram;

generating one or more filter parameter values based, at least in part, on the histogram; and enhancing the image based, at least in part, on the one or more filter parameter values.

9. The method of claim 8, wherein causing the processor to obtain an image comprises obtaining an image that is a scaled version of another image.

10. The method of claim 8, wherein obtaining an image comprises obtaining chroma channel information of an image.

11. The method of claim 8, wherein identifying a neighbor pixel comprises identifying a pixel that is immediately adjacent to the first pixel.

12. The method of claim 8, wherein updating each histogram entry comprises incrementing each histogram entry between the first and second entries of the histogram.

13. The method of claim 12, further comprising incrementing the first and second entries of the histogram.

14. The method of claim 8, wherein enhancing the image further comprises storing the enhanced image in a memory.

15. A non-transitory program storage device, readable by a processor and comprising instructions stored thereon to cause the processor to:
obtain an image having pixels;
select, from the pixels, a first pixel having a first pixel value, the first pixel value corresponding to a first entry of a histogram;
identify, from the pixels, a plurality of neighbor pixels based, at least in part, on the first pixel, each neighbor pixel having a neighbor pixel value, each neighbor pixel value corresponding to a second entry in the histogram;
for each of the plurality of neighbor pixels, update each histogram entry between the first entry and the second entry;
modify the image based, at least in part, on the histogram.

16. The non-transitory program storage device of claim 15, wherein the instructions to cause the processor to identify a plurality of neighbor pixels comprise instructions to cause the processor to identify pixels that are immediately adjacent to the first pixel.

17. The non-transitory program storage device of claim 15, wherein the instructions to cause the processor to modify the image comprise instructions to cause the processor to:
generate one or more filter parameters based, at least in part, on the histogram; and
filter the image based, at least in part, on the one or more filter parameters.

18. An image enhancement method, comprising:
obtaining an image having pixels;
selecting, from the pixels, a first pixel having a first pixel value, the first pixel value corresponding to a first entry of a histogram;
identifying, from the pixels, a plurality of neighbor pixels based, at least in part, on the first pixel, each neighbor pixel having a neighbor pixel value, each neighbor pixel value corresponding to a second entry in the histogram;
updating, for each of the plurality of neighbor pixels, each histogram entry between the first entry and the second entry; and
modifying the image based, at least in part, on the histogram.

19. The method of claim 18, wherein identifying a plurality of neighbor pixels comprises identifying neighbor pixels that are immediately adjacent to the first pixel.

20. The method of claim 18, wherein modifying the image comprises:
generating one or more filter parameters based, at least in part, on the histogram; and
filtering the image based, at least in part, on the one or more filter parameters.

21. A non-transitory program storage device, readable by a processor and comprising instructions stored thereon to cause the processor to:
obtain an image having pixels;
select, from the pixels, a first pixel having a first pixel value, the first pixel value corresponding to a first entry of a histogram;
identify a first pixel unit based, at least in part, on the first pixel, the first pixel unit having a plurality of pixels and a first pixel unit value;
identify a plurality of neighbor pixel units based, at least in part, on the first pixel, each neighbor pixel unit having a plurality of pixels and a neighbor pixel unit value;
select one of the plurality of neighbor pixel units based, at least in part, on the first pixel unit value and the plurality of neighbor pixel unit values;
for each of the plurality of pixels in the selected neighbor pixel unit—
select a first neighbor pixel from the selected neighbor pixel unit, the selected neighbor pixel having a selected neighbor pixel value, the selected neighbor pixel value corresponding to a selected second histogram entry,
update each histogram entry between the first histogram entry and the selected second histogram entry; and
modify the image based, at least in part, on the histogram.

22. The non-transitory program storage device of claim 21, wherein the instructions to cause the processor to select one of the plurality of neighbor pixel units comprise instructions to cause the processor to select that neighbor pixel unit having a neighbor pixel unit value most different from the first pixel unit value.

23. The non-transitory program storage device of claim 21 wherein the instructions to cause the processor to update each histogram entry between the first histogram entry and the selected second histogram entry comprise instructions to cause the processor to increment each histogram entry between the first histogram entry and the selected second histogram entry.

24. The non-transitory program storage device of claim 21 wherein the instructions to cause the processor to update each histogram entry between the first histogram entry and the selected second histogram entry further comprise instructions to cause the processor to update the first histogram entry and the selected second histogram entry.

25. An image processing method, comprising:
obtaining an image having pixels;
selecting, from the pixels, a first pixel having a first pixel value, the first pixel value corresponding to a first entry of a histogram;
identifying a first pixel unit based, at least in part, on the first pixel, the first pixel unit having a plurality of pixels and a first pixel unit value;
identifying a plurality of neighbor pixel units based, at least in part, on the first pixel, each neighbor pixel unit having a plurality of pixels and a neighbor pixel unit value;
selecting one of the plurality of neighbor pixel units based, at least in part, on the first pixel unit value and the plurality of neighbor pixel unit values;
for each of the plurality of pixels in the selected neighbor pixel unit— selecting a first neighbor pixel from the selected neighbor pixel unit, the selected neighbor pixel having a selected neighbor pixel value, the selected neighbor pixel value corresponding to a selected second histogram entry, updating each histogram entry between the first histogram entry and the selected second histogram entry; and modifying the image based, at least in part, on the histogram.

26. The method of claim 25, wherein selecting one of the plurality of neighbor pixel units comprises selecting that neighbor pixel unit having a neighbor pixel unit value most similar to the first pixel unit value.

27. The method of claim 25, wherein updating each histogram entry between the first histogram entry and the selected second histogram entry comprises incrementing each histogram entry between the first histogram entry and the selected second histogram entry.

28. The method of claim 25, wherein updating each histogram entry between the first histogram entry and the selected second histogram entry further comprises updating the first histogram entry and the selected second histogram entry.

29. An electronic device, comprising:
an image capture unit;
one or more processing units, at least one of which is operatively coupled to the image capture unit; and
a memory having stored therein instructions executable by at least one of the one or more processing units to perform the method of claim 8.

30. An electronic device, comprising:
an image capture unit;
one or more processing units, at least one of which is operatively coupled to the image capture unit; and
a memory having stored therein instructions executable by at least one of the one or more processing units to perform the method of claim 18.

31. An electronic device, comprising:
an image capture unit;
one or more processing units, at least one of which is operatively coupled to the image capture unit; and
a memory having stored therein instructions executable by at least one of the one or more processing units to perform the method of claim 25.

* * * * *

UNITED STATES PATENT AND TRADEMARK OFFICE
CERTIFICATE OF CORRECTION

PATENT NO. : 8,970,739 B2
APPLICATION NO. : 13/412368
DATED : March 3, 2015
INVENTOR(S) : Webb et al.

It is certified that error appears in the above-identified patent and that said Letters Patent is hereby corrected as shown below:

In the Claims

Column 11 Lines 7-8 Claim 9 replace "causing the processor to obtain" with --obtaining--.

Signed and Sealed this
Second Day of June, 2015

Michelle K. Lee
*Director of the United States Patent and Trademark Office*